United States Patent
Kim et al.

(10) Patent No.: US 7,562,983 B2
(45) Date of Patent: Jul. 21, 2009

(54) THREE-DIMENSIONAL DISPLAY DEVICE

(75) Inventors: Eun-Soo Kim, #1-207 Dongshin APT., 436, Wolgye-dong, Nowon-gu, Seoul 139-050 (KR); Sun-Joo Jang, 68-1278, Jangwi 2-dong, Seongbuk-gu, Seoul 136-142 (KR)

(73) Assignees: Kwangwoon University Research Institute for Industry Cooperation, Seoul (KR); Eun-Soo Kim, Seoul (KR); Sun-Joo Jang, Seoul (KR)

( * ) Notice: Subject to any disclaimer, the term of this patent is extended or adjusted under 35 U.S.C. 154(b) by 394 days.

(21) Appl. No.: 11/514,553

(22) Filed: Aug. 31, 2006

(65) Prior Publication Data

US 2006/0291051 A1    Dec. 28, 2006

Related U.S. Application Data

(63) Continuation of application No. PCT/KR2005/000719, filed on Mar. 11, 2005.

(30) Foreign Application Priority Data

Dec. 31, 2004    (KR) ............... 10-2004-0118292

(51) Int. Cl.
*G03B 21/14*    (2006.01)
(52) U.S. Cl. .................. 353/10; 353/7; 353/28; 353/78; 359/461; 359/458
(58) Field of Classification Search ............ 353/7, 353/10, 28, 74, 77, 78, 98, 99; 359/462, 359/458, 466, 471, 477, 461
See application file for complete search history.

(56) References Cited

U.S. PATENT DOCUMENTS

| 3,537,771 | A  |   | 11/1970 | Trufanoff |
| 4,093,347 | A  | * | 6/1978  | La Russa .................... 359/630 |
| 4,671,625 | A  |   | 6/1987  | Noble |
| 5,483,307 | A  | * | 1/1996  | Anderson .................... 353/98 |
| 5,782,547 | A  | * | 7/1998  | Machtig et al. ............... 353/28 |
| 6,055,100 | A  | * | 4/2000  | Kirk ........................... 359/457 |
| 6,364,490 | B1 | * | 4/2002  | Krause ....................... 353/77 |
| 6,375,326 | B2 |   | 4/2002  | Mayers |

(Continued)

FOREIGN PATENT DOCUMENTS

JP    8-68981    3/1996

OTHER PUBLICATIONS

International Search Report for PCT/KR2005/000719, date of mailing of the ISR, Sep. 26, 2005.

*Primary Examiner*—William C Dowling
(74) *Attorney, Agent, or Firm*—Knobbe Martens Olson & Bear LLP

(57) ABSTRACT

A three-dimensional image display device is disclosed. In one embodiment, the device uses a curved transmissive screen and reflectors to minimize the space associated with the device when increasing the size of the three-dimensional image. By placing a physically driven background screen over the projected image and screen, excessively diffused reflection of the Fresnel lenses is eliminated. High-resolution real-time video images are provided as three-dimensional images by realizing three-dimensional images with enhanced perspective as if they are floating in space. According to one embodiment of the invention, a distortion of the three-dimensional image is minimized.

13 Claims, 10 Drawing Sheets

U.S. PATENT DOCUMENTS

| | | |
|---|---|---|
| 6,808,268 B2 * | 10/2004 | Vrachan et al. ................ 353/10 |
| 7,180,663 B2 * | 2/2007 | Collender et al. ............ 359/451 |
| 7,224,526 B2 * | 5/2007 | Putilin et al. ................. 359/462 |
| 2003/0020879 A1 * | 1/2003 | Sonehara ....................... 353/7 |

* cited by examiner

THREE-DIMENSIONAL DISPLAY DEVICE

RELATED APPLICATIONS

This application is a continuation application, and claims the benefit under 35 U.S.C. §§ 120 and 365 of PCT Application No. PCT/KR2005/000719, filed on Mar. 11, 2005, which is hereby incorporated by reference.

BACKGROUND OF THE INVENTION

1. Field of the Invention

The present invention relates to a three-dimensional image display device, more specifically to a three-dimensional image display device creating an effect of three dimensions by displaying an enlarged two-dimensional image as a three-dimensional form with real depth in the air, using a transmissive screen, displayed through the image source, a reflector (or reflectors), and a double Fresnel lenses structure.

2. Description of the Related Technology

Three-dimensional display refers to a technology using, for example, the stereoscopic technology to add depth to two-dimensional images and using this depth to allow the viewer to feel the sense of animateness and reality. Various types and methods of conventional three-dimensional display devices have been suggested using these technologies. Most of these technologies have displayed three-dimensional images using the difference in visual angles between left and right eyes. A typical form of this application separates the left and right images, mainly with or without using eyeglasses.

Using glasses are an anaglyph method, a polarized glasses method, and a liquid crystal shutter method, while without glasses are a lenticular sheet method, a parallax barrier method, and an optical plate method. Among these conventional methods, the polarized glasses method has been the oldest and most widely used, utilized in three-dimensional (3D) movies and 3D monitors owing to its stability. The weakness of this method, however, lies in the requirement of using special polarized glasses for three-dimensional images. The lenticular sheet method and parallax barrier method, not using eyeglasses, have problem of low brightness and resolution, and causes headaches or dizziness when viewed for an extended period of time. While the holographic method and volumetric 3D display method can realize three-dimensional images freely in the air, they require expensive laser and precision optical components to display even a still image, and can not provide real-time three-dimensional images.

As means for solving these problems, some of the non-glasses methods have utilized reflectors, general optical lenses, and concave mirrors to enable real-time three-dimensional images at lower costs. However, these methods experience distortion of images due to the concave of the mirrors and high costs of manufacturing due to their large size. The need for a large space particularly, if a large screen is desired, has been largely complicating the application and commercialization of these methods.

In addition to these methods using concave mirrors and reflectors, the methods, using Fresnel lenses have been variously proposed for a long time. U.S. Pat. No. 3,537,771 discloses that two Fresnel lenses can be used to provide a three-dimensional image effect, and U.S. Pat. No. 5,782,547 discloses that one, two, or more Fresnel lenses and reflectors can be used to create various forms of three-dimensional images. These methods, however, require large transmissive reflectors and two or more image sources in order to realize a three-dimensional image on a large screen, resulting in higher manufacturing costs and hefty spatial design.

U.S. Pat. No. 6,055,100 realizes large screen three-dimensional images using 2 Fresnel lenses and a liquid crystal projector, but practical display of three-dimensional images is restricted by the distortion of three-dimensional images, created for a wide-angle view, and the limitation in image size.

Referring to FIG. 1, which shows a three-dimensional display device based on prior art, a two-dimensional image is projected from an image source supply unit 4 along projection lines 7, 8 and formed on a reflective screen 5 before being projected toward Fresnel lenses along projection lines 9, 10. A first Fresnel lens 1 and a second Fresnel lens 2 work in combination like a single lens to project an image along projection lines 11, 12 to a focal plane 6 within a focal length 13 of double Fresnel lenses 3. In order to display a large size three-dimensional image, there needs to be a substantial distance between the first Fresnel lens and an image projected to the screen from the image source supply unit 4 to obtain a desired three-dimensional image on the focal plane 6. The image projected to the reflective screen 5 becomes a convex screen of a semi-spherical shape by forming the three-dimensional image on the focal plane 6 to face the direction of the grooves of first and second Fresnel lenses. The semi-spherical focal plane 6 uses only a quarter of the entire screen size of the second Fresnel lens, and the image from the image source 4 is distorted toward the fringe of the focal plane 6. Moreover, the semi-spherical focal plane, formed by the double Fresnel lenses, has a sharp circular boundary, lessening the sense of depth.

U.S. Pat. No. 6,375,326 discloses a method of using a Fresnel lens and a reflector to achieve the same effect as using two Fresnel lenses, but it also requires a large space between the top and bottom as well as the front and back, compared with the screen size of the three-dimensional image, when large three-dimensional images are desired. The shortened projection distance, owing to the adaptation of a reflector, also reduces the sense of depth.

As described so far, the conventional methods experience problems of high manufacturing costs, when large three-dimensional images are desired, and distortion of images, as well as a large projection space needed when the device is made larger. As these problems are inherent properties of Fresnel lenses, the image source must be separated proportional to the focal length of the Fresnel lens, the spherical formation of the three-dimensional image distorts the fringe of an image due to the image source screen being a two-dimensional plane behind the double Fresnel lenses, the inherent reflective property of Fresnel lenses creates virtual images, and the reflection of external light shallows the depth of three-dimensionality.

SUMMARY OF CERTAIN INVENTIVE ASPECTS

One aspect of the present invention provides a three-dimensional image display device capable of displaying a real depth large screen at a low manufacturing cost by adjusting the size of three-dimensional images through the adjustment of a first Fresnel lens and a second Fresnel lens of double Fresnel lenses and compensating for distorted images resulted from the use of a curved type transmissive screen when the size of a conventional device is increased.

Another aspect of the present invention provides a large screen three-dimensional image display device using a curved type transmissive screen and a reflector such that a small projection space is needed, thereby minimizing the space for installation of the device.

Another aspect of the present invention provides a three-dimensional image display device using a physical background filter of a mobile or fixed type, such that diffused reflection and spherical boundary resulted from the arrangement of double Fresnel lenses are eliminated, and the three-dimensional image has relatively higher perspective over the background filter. Other aspects of the present invention will be become more apparent through embodiments described below.

Still another aspect of the present invention provides a three-dimensional image display device that can solve the problems of image distortion and bulky size of conventional art.

In one embodiment, the three-dimensional image display device has an image source supply unit for supplying an image source, a reflecting unit for converting and reflecting the image source projected by the image source supply unit to a curved image, and a Fresnel lens unit for refracting and enlarging the curved image reflected by the reflecting unit and forming a three-dimensional image on a focal plane.

In one embodiment, the reflecting unit is a reflective curved screen with certain curvature, for reflecting a curved image to the Fresnel lens unit. The reflecting unit can have a first reflector for reflecting the image source, a transmissive curved screen having certain curvature for converting the image reflected by the first reflector to the curved image, and a second reflector for reflecting the curved image transmitted by the transmissive curved screen to the Fresnel lens unit. The reflecting unit can also comprise a first reflector for reflecting the image source at a certain angle, a second reflector for reflecting the image reflected by the first reflector at a certain angle, a transmissive curved screen having certain curvature for converting the image reflected by the second reflector to the curved image, and a third reflector for reflecting the curved image transmitted by the transmissive curved screen to the Fresnel lens unit.

The Fresnel lens unit can have a first Fresnel lens unit, to which the curved image is projected, and a second Fresnel lens, from which the three-dimensional image is projected, and each Fresnel lens can have a certain focal length. The distortion of a three-dimensional image is reduced in accordance with the difference of the distance between the center of the curved image and the first Fresnel lens and the distance between the fringe of the curved image and the first Fresnel lens.

Still another aspect of the present invention provides a three-dimensional image display device using a mobile, physical background screen to eliminate diffused reflection caused by the double Fresnel lens arrangement and provide enhanced three-dimensional perspective.

In one embodiment, the three-dimensional image display device has a background screen filter, on which perforations with a certain diameter are uniformly distributed, placed in front of a Fresnel lens unit for forming a three-dimensional image on a focal plane, axles for winding the background screen filter, and motors for rotating the axles. In one embodiment, the three-dimensional image is displayed on a background screen, physically changing with the rotation of the axles.

DETAILED DESCRIPTION OF CERTAIN INVENTIVE EMBODIMENTS

Figure 1:
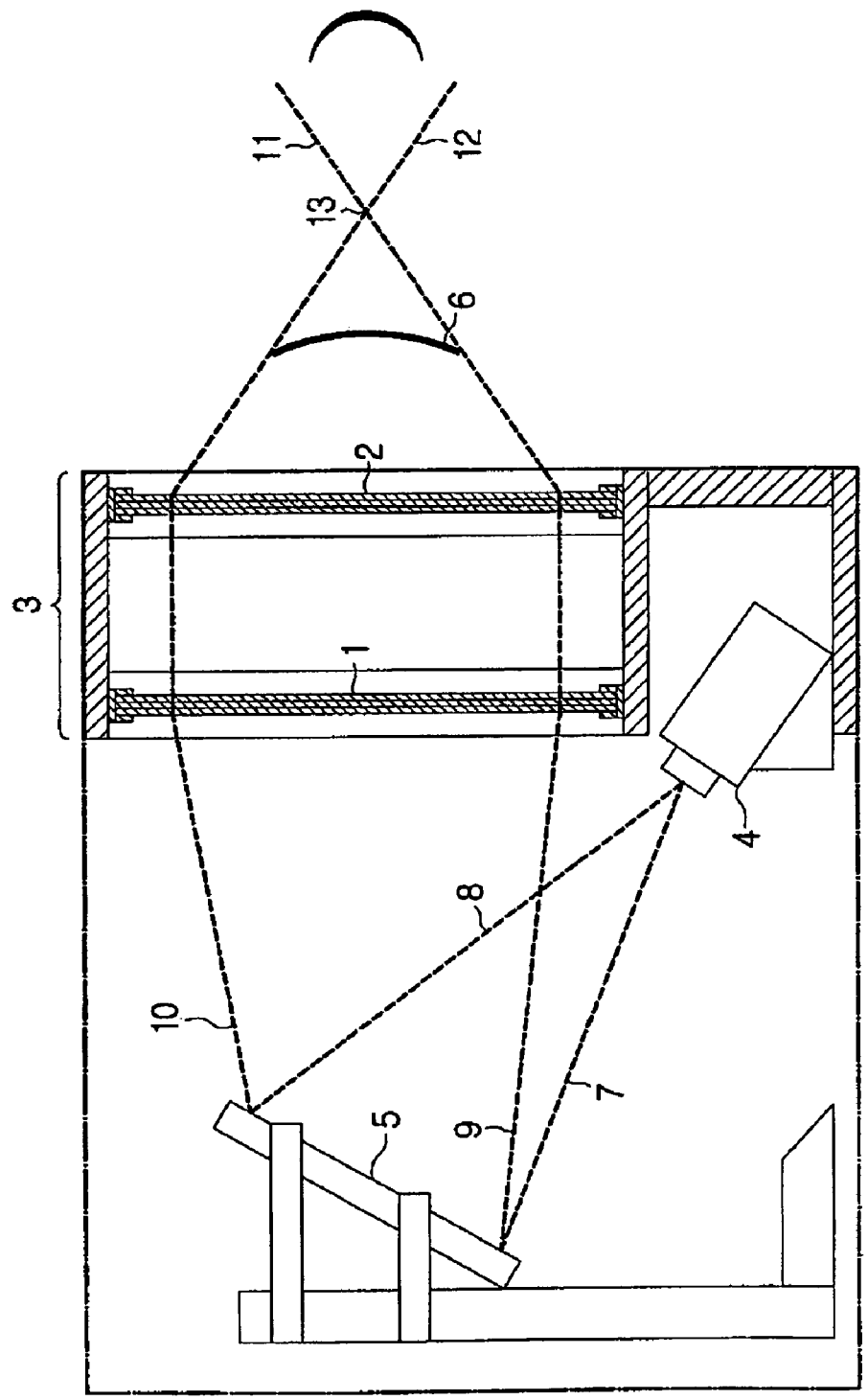
FIG. 1 shows a display device in accordance with conventional art.

Hereinafter, embodiments of this invention will be described in detail with reference to the accompanying drawings. In making reference to the accompanying drawings, identical or similar components, regardless of the figure number, will be given an identical reference numeral, and any redundant description will not be provided.

Comparison of the Structure between Prior Art and One Embodiment of the Present Invention The Fresnel lenses, referred to in embodiments of the present invention, are given a certain pattern of curvature on the surface such that they have identical optical properties with general convex lenses, and are commonly used in projection televisions and overhead projectors. This type of Fresnel lenses is called positive relief Fresnel lenses. In the double Fresnel lens structure, it is possible to substitute them with negative relief Fresnel lenses, depending on the direction the grooves of a Fresnel lens are arranged. Below, with reference to FIGS. 2 and 3, the method of creating three-dimensional images will be described using the arrangement structure of two Fresnel lenses, based on embodiments of conventional art and the present invention.

Figure 2:
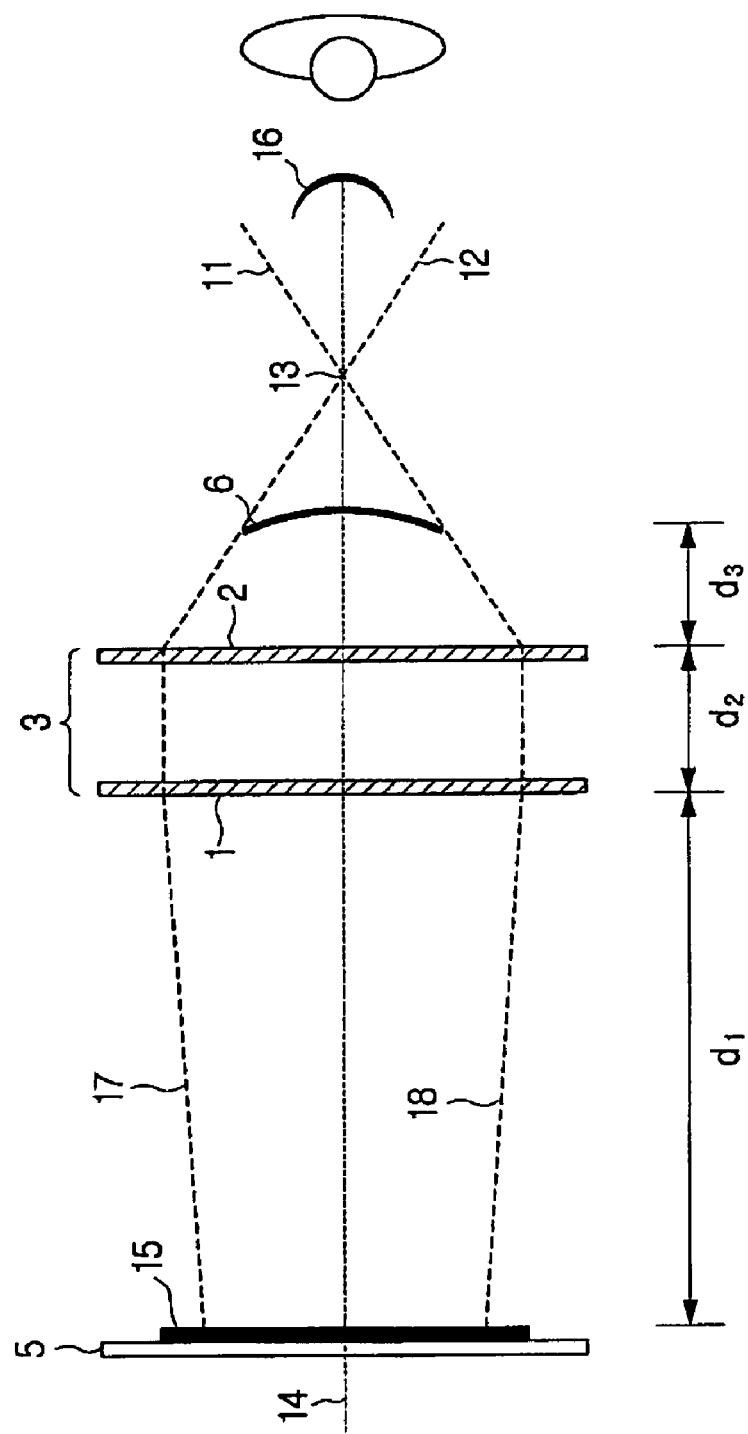
FIG. 2 shows the structure of double Fresnel lenses in accordance with conventional art.

FIG. 2 is a diagram illustrating the principle of realizing a three-dimensional image using a double Fresnel lens structure based on a conventional art.

Referring to FIG. 2 to describe the principle of creating a three-dimensional image using Fresnel lenses based on a conventional art, two single Fresnel lenses are serially arranged, and then the distance d2 between the two lenses are adjusted such that the two Fresnel lenses have the property similar to that of a single lens.

As with any lens, a Fresnel lens also has an F number. The focal length and F number in accordance with the diameter of a Fresnel lens have the following relation expressed in Eq. 1. Here, f is the focal length of a Fresnel lens, D the diameter of the Fresnel lens, and F the F number.

$$F = \frac{f}{D} \qquad [\text{Eq. 1}]$$

A Fresnel lens has an F number and a focal length. In general, there are two types of Fresnel lenses: the positive relief Fresnel lens, functioning as a collector, which refracts parallel incident light to converge to the focal point of the Fresnel lens, or as a collimator, which refracts incident light to the opposite direction to have a parallel path, and the negative relief Fresnel lens, functioning as a diverger, which disperses parallel incident light.

Here, when projecting a two-dimensional image source using two Fresnel lenses, the focal plane of the projected image source is formed as a semi-spherical shape on a plane at the focal length of the double Fresnel lenses 3. When viewed from the perspective of an observer, the actual focal plane 16 seems as if it is floating in space. However, since this spherical focal plane is rendered from a two-dimensional image of the image source, distortion of the image becomes severer toward the fringe of the focal plane. When three-dimensional images are displayed using this conventional method, this problem limits the projection to only about a quarter of the surface area of a Fresnel lens.

The size of a three-dimensional image projected from the focal plane and the distance d3 can be changed by adjusting the distance d1 between the image source 5 and the double Fresnel lenses 3, including the first Fresnel lens 1 and the second Fresnel lens 2. Also, by changing the distance d2, which is the distance between the first Fresnel lens 1 and the second Fresnel lens 2, the distance d3 to the focal plane 6 projected from the second Fresnel lens 2 can be adjusted. The two-dimensional image from the image source passes through the first Fresnel lens 1 along the projection lines 17, 18, and the image from the image source projected into the first Fresnel lens 1 becomes refracted toward the focal point of the lens. The image, converged as such, passes through the second Fresnel lens 2, and becomes refracted again toward the focal point of the second Fresnel lens 2. At this time, the first Fresnel lens 1 and the second Fresnel lens 2 work like a single Fresnel lens, having a focal length that is equal to or shorter than the focal length of each Fresnel lens, and a three-dimensional image is formed on the focal plane 6. In other words, the double-refracted image of the image source is projected to the focal plane of the double Fresnel lenses 3 to form a two-dimensional image. There can be two shapes of focal plane, depending on the direction of grooves on the Fresnel lens. If the curved surfaces of the first Fresnel lens 1 and second Fresnel lens 2 are arranged to face each other, a semi-spherical focal plane is formed, while a less-spherical focal plane is formed if the grooves are arranged to face against each other or to face to the same direction.

By projecting a three-dimensional image by use of a flat screen, as in FIG. 2 showing conventional art, a semi-spherical three-dimensional image source having a wide visual angle can be obtained on the focal plane, depending on the properties of the double Fresnel lenses. However, a relatively small area of the Fresnel lenses, in comparison with the size of the entire screen, is used for displaying, and the image becomes more distorted toward the fringe.

Figure 3:
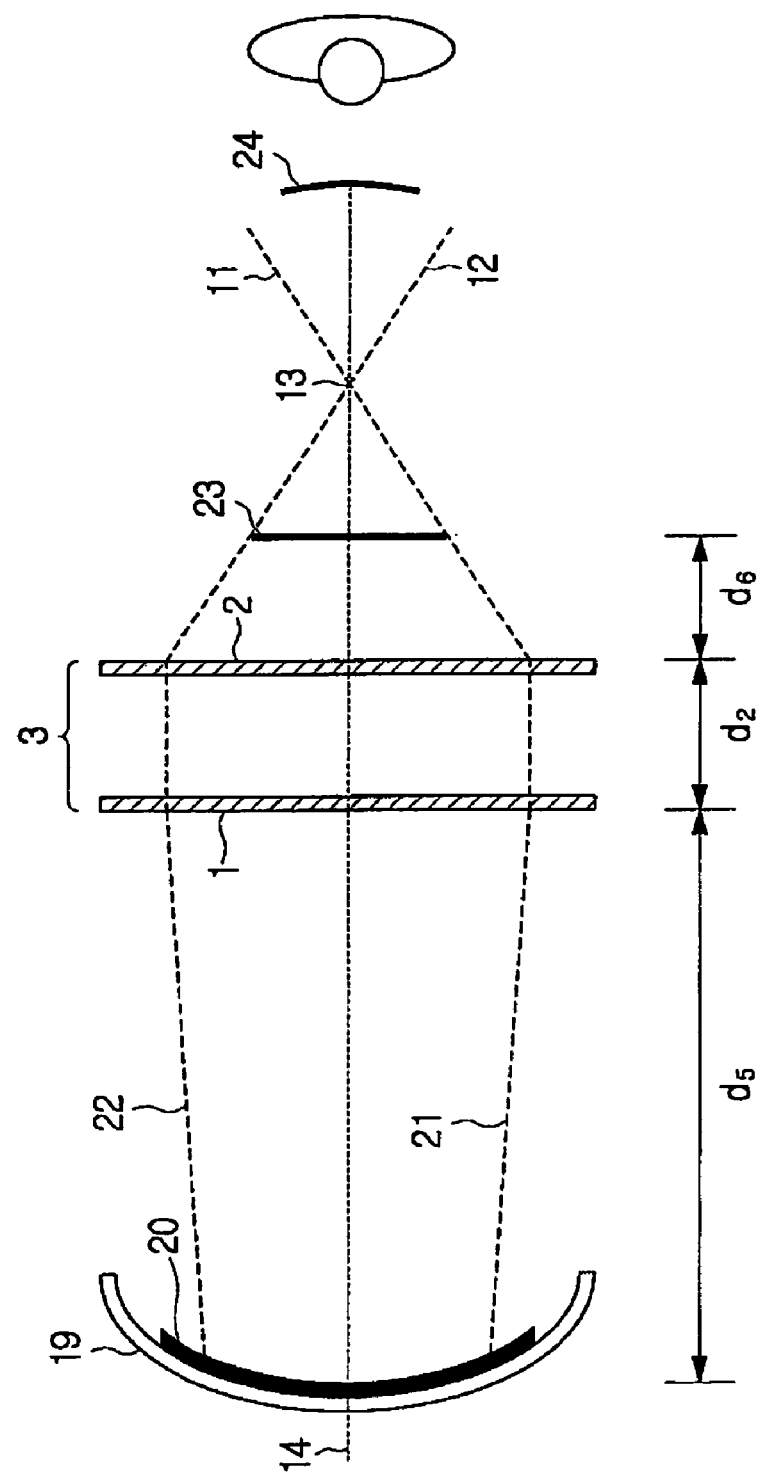
FIG. 3 shows the structure of double Fresnel lenses in accordance with one embodiment of the present invention.

FIG. 3 illustrates the principle of realizing a three-dimensional image using a curved screen based on one embodiment of the present invention.

Referring to FIG. 3, by using a curved screen 19 to project an image source 20, a flat three-dimensional image, not a semi-spherical one, of the image source 20 can be obtained on a focal plane 23. Also, the three-dimensional image on the focal plane 23 has less distortion near the fringe, enabling to realize a three-dimensional image that is larger than that of conventional art.

There is a difference between the distance d5, which is the distance between the center of the image source 20 and the first Fresnel lens 1 along the optical axis 14, and the distance between the edge of the image source and the first Fresnel lens 1. Due to this difference of distance, the image formed on the focal plane 23 of the double Fresnel lenses 3 becomes flatter than the image formed by a conventional art shown in FIG. 2. Such focal plane 23 shows improved distortion near the fringe of the focal plane, enabling the enlargement to a much larger screen than the three-dimensional image by a conventional art could, thereby allowing the observer to watch a three-dimensional image on an actual focal plane 24.

In order to obtain a large three-dimensional image, the focal lengths of the first Fresnel lens 1 and second Fresnel lens 2 can be arranged to be identical or different in the double Fresnel lens 3 structure. According to an embodiment of the present invention, the F number of each Fresnel lens is between 0.5 and 1.5. With an F number higher than 1.5, the image becomes blurry; with an F number lower than 0.5, manufacturing becomes difficult, and an actual image gets projected, departing from at least one embodiment of the invention. As such, double Fresnel lenses also have a single F number, and according to the embodiment, the F number is either identical to or half of the F number of a Fresnel lens of the same focal length. The distance d2 between the first Fresnel lens 1 and second Fresnel lens 2 is either identical to or smaller than half of the focal length of the double Fresnel lenses. The distance between the two lenses can be adjusted to be from moiré fringe. When the distance d5 between the first Fresnel lens and the screen is three times the focal length of the double Fresnel lenses, the distance d6 between the second Fresnel lens and the focal plane becomes half of the focal length of the double Fresnel lenses. As such, a preferred three-dimensional image can be obtained when the distance d5 is at least between 1.5 times and 2 times the focal length of the double Fresnel lenses.

Three-Dimensional Image Display Device

According to one embodiment of the present invention, the three-dimensional image display device has an image source supply unit for supplying an image source, a reflecting unit for converting and reflecting the image source projected by the image source supply unit to a curved image, and a Fresnel lens unit for refracting and enlarging the curved image reflected by the reflecting unit and forming a three-dimensional image on a focal plane.

Figure 4:
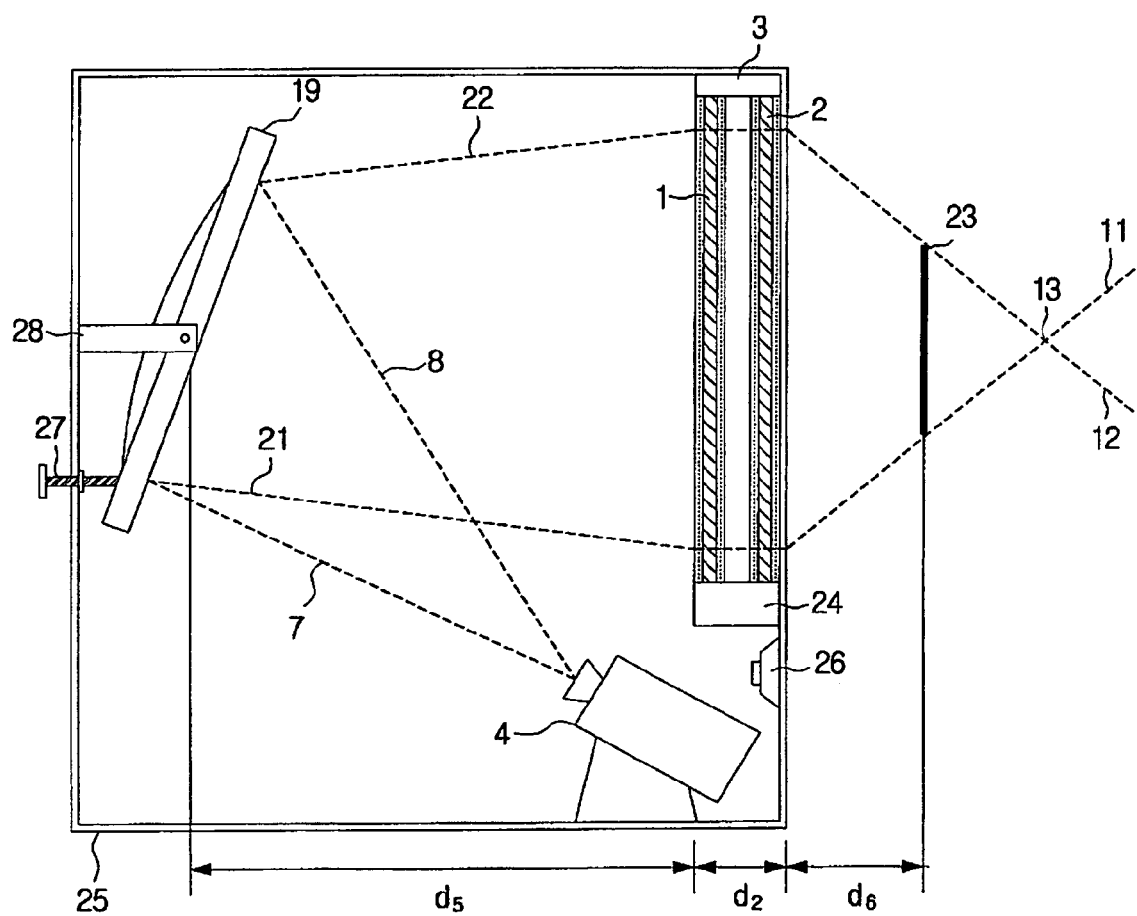
FIG. 4 shows a structural diagram of a three-dimensional image display device in accordance with a first embodiment of the present invention.

According to a first embodiment, the reflecting unit is a reflective curved screen with certain curvature, for reflecting a curved image to the Fresnel lens unit (see FIG. 4). According to a second embodiment, the reflecting unit can have a first reflector for reflecting the image source, a transmissive curved screen having certain curvature for converting the image reflected by the first reflector to the curved image, and a second reflector for reflecting the curved image transmitted by the transmissive curved screen to the Fresnel lens unit (see FIGS. 5 and 6). According to a third embodiment, the reflecting unit can also comprises a first reflector for reflecting the image source at a certain angle, a second reflector for reflecting the image reflected by the first reflector at a certain angle, a transmissive curved screen having certain curvature for converting the image reflected by the second reflector to the curved image, and a third reflector for reflecting the curved image transmitted by the transmissive curved screen to the Fresnel lens unit (see FIG. 7). The structure of a three-dimensional image display device based on one embodiment of the present invention will be described below with reference to FIGS. 4 through 7.

FIG. 4 is a structural diagram of a three-dimensional image display device based on one embodiment of a first embodiment of the present invention.

In one embodiment, the three-dimensional image display device uses a curved transmissive screen to project a two-dimensional image from an image source supply unit, and forms a three-dimensional image, whose distortion is corrected by adjusting the distance between a first Fresnel lens 1 and a second Fresnel lens 2, on a focal plane of the double Fresnel lenses 3. To minimize the space the device takes, the screen, projected by the image source supply unit 4 through a reflector 31, and the double Fresnel lenses are maintained at a certain distance to project a large three-dimensional image in space.

In one embodiment, a three-dimensional image display device 25 uses a high brightness curved screen 19 and double Fresnel lenses 3. The image source directly projected from a liquid crystal projector 4 is reflected by the high brightness curved screen and passed through the first Fresnel lens 1 and the second Fresnel lens 2 to realize a large three-dimensional image on the focal plane 23 that looks like floating in space.

According to one embodiment of the invention, the image source can use the liquid crystal projector 4 to obtain a large size two-dimensional image in order to obtain a three-dimensional image. Such three-dimensional image is formed on the focal plane 23 of the double Fresnel lenses from the image on the curved screen 19. The location of focal plane and size of three-dimensional image can be obtained by adjusting the distance d5, between the curved screen and the first Fresnel lens 1, and the distance d2, between the first Fresnel lens 1 and the second Fresnel lens 2.

According to one embodiment of the present invention, the direct distance between the curved screen and the image source is about 1.13m, and the direct distance between the center of the curved screen and the first Fresnel lens is about 1 m. The distance between the first Fresnel lens and second Fresnel lens is between about 4 cm and 20 cm. The Fresnel lenses used here are positive relief Fresnel lenses, with the width of 230 cm and the height of 150 cm, and have the same focal length. The distance of a three-dimensional image is between 110 cm and 130 cm, and the diameter of the image is 110 cm.

In a conventional art, the device takes up a large space since a sufficient distance must be provided behind the screen for the focal length of double Fresnel lenses. On the other hand, at least one embodiment of the present invention uses a reflector to reduce the distance between the curved screen and the first Fresnel lens, thereby minimizing the size of a three-dimensional image display device.

Figure 5:
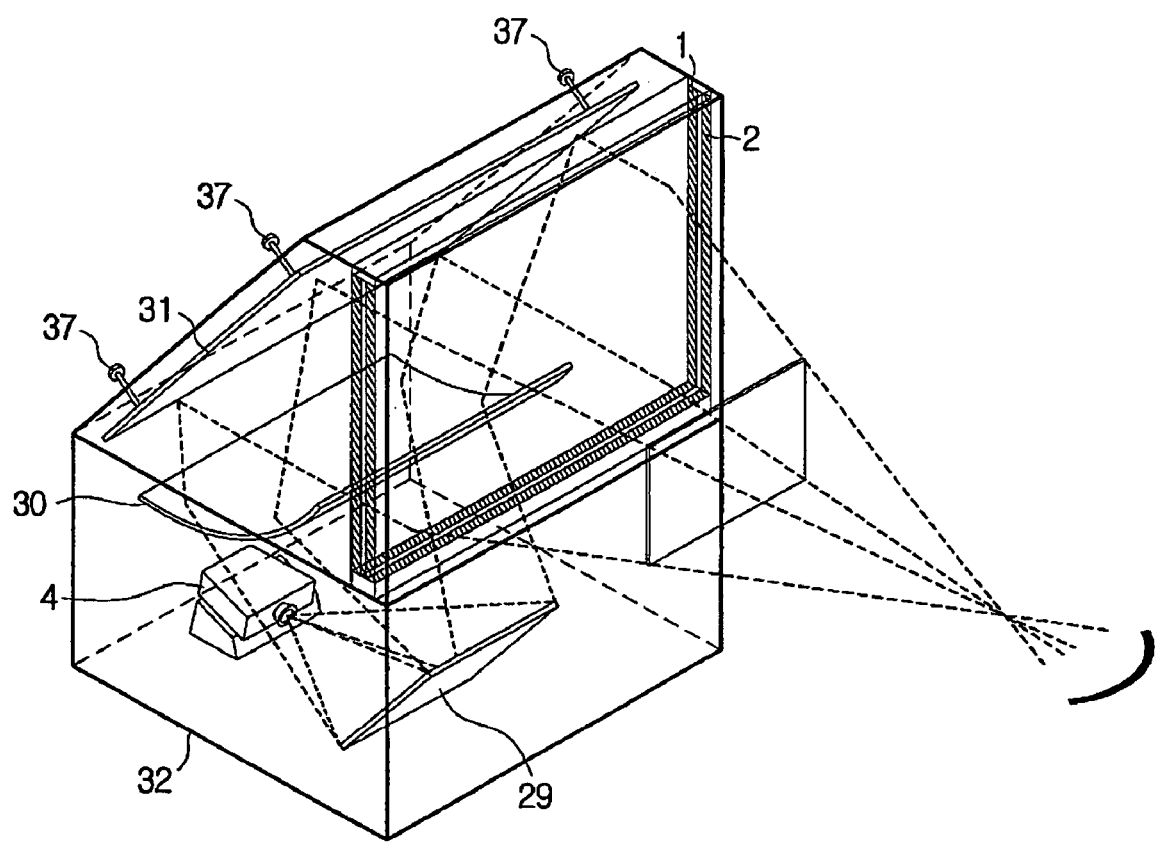
FIG. 5 shows a structural diagram of a three-dimensional image display device in accordance with a second embodiment of the present invention.
Figure 6:
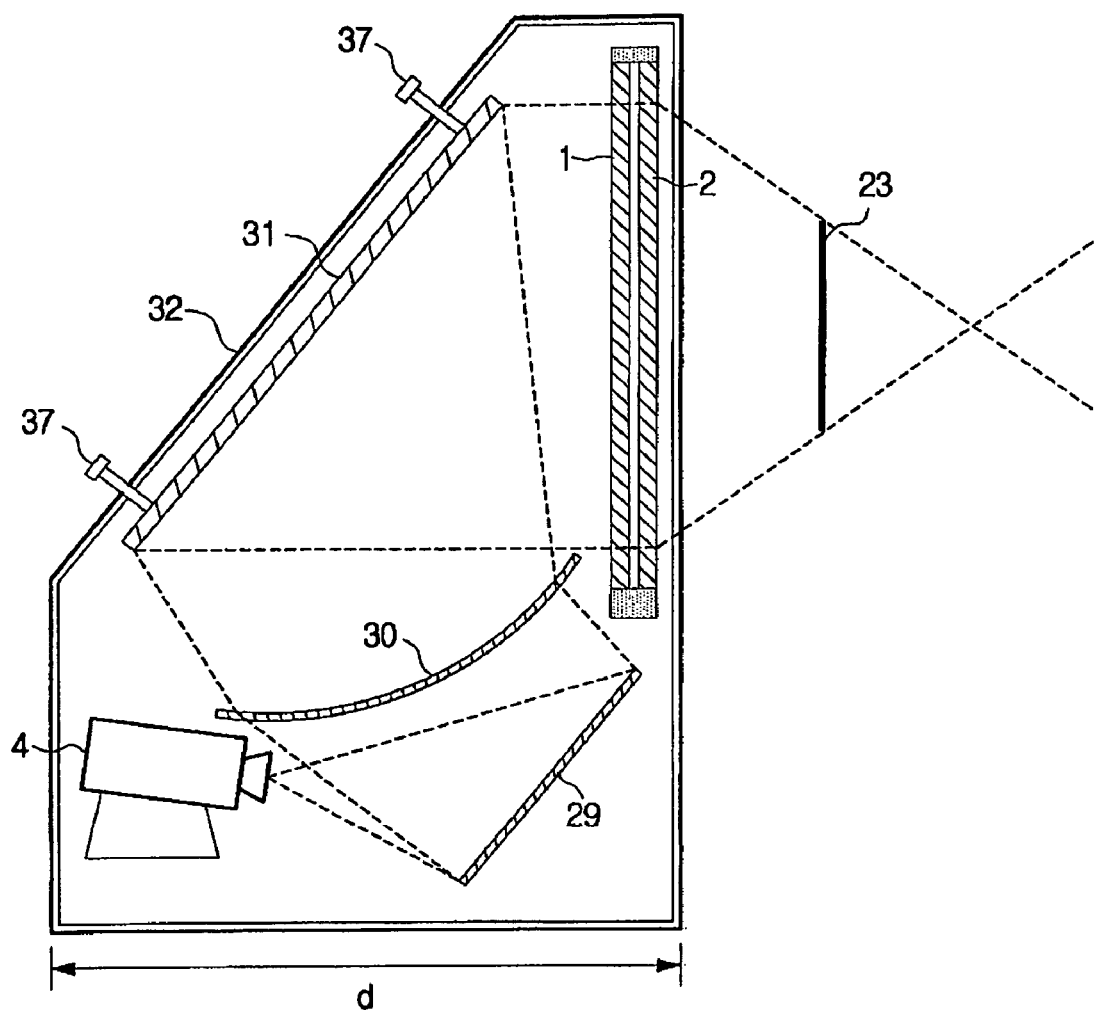
FIG. 6 shows the side view of the second embodiment.

FIG. 5 is a structural diagram of a three-dimensional image display device based on a second embodiment of the present invention, and FIG. 6 is a side view based on the second embodiment.

Referring to FIG. 5, the three-dimensional image display device 32 has a first reflector 29 and a liquid crystal projector for having a large image formed by an image source supply unit 4, a curved transmissive screen 30 for reducing distortion, a second reflector 31 for reflecting an image on the screen toward a first Fresnel lens 1, a controller unit 37 for adjusting the angle of the second reflector, and a first Fresnel lens 1 and a second Fresnel lens 2 for forming a three-dimensional image on a focal plane 23. As shown in FIG. 5, a large image source is needed for a larger three-dimensional image. Hence, the projection distance between the liquid crystal projector and the screen can be adjusted by use of 1 or 2 reflectors such that the image source is enlarged.

The optical principle of having a three-dimensional image formed by a curved screen 30, as shown in FIG. 5, is as follows: A projected image of a liquid crystal projector is reflected on a reflector for enlargement of image, and the image is projected to an inherent projection location of the liquid crystal projector to be formed on the curved transmissive screen. The image formed on the curved transmissive screen passes through the screen and then a large reflector. The standard angle of the large reflector is 45 degrees, and can be adjusted up, down, left, and right such that the image of the image source is not distorted. The reflected image of the image source is then passed through a first Fresnel lens 1 and a second Fresnel lens 2, and a large three-dimensional image with no image distortion can be formed on the focal plane 23 of the double Fresnel lenses.

Here, the image source supply unit may be substituted with any general display device, such as CRT, LCD monitor, and PDP monitor, by placing a curved transmissive screen in front of it. The effect of three-dimensionality can be maximized by adding a variety of supplementary devices utilizing IR communication or RF communication. A three-dimensional sound system may also be included to enhance the three-dimensional effect by providing matching sounds with the image.

Referring to FIG. 6, the size of an image of the image source 4, projected on the curved transmissive screen 30, can be adjusted by use of one or two reflectors 29. Moreover, a three-dimensional image can be obtained by adjusting the distance between the first Fresnel lens 1 and the second Fresnel lens 2.

Figure 7:
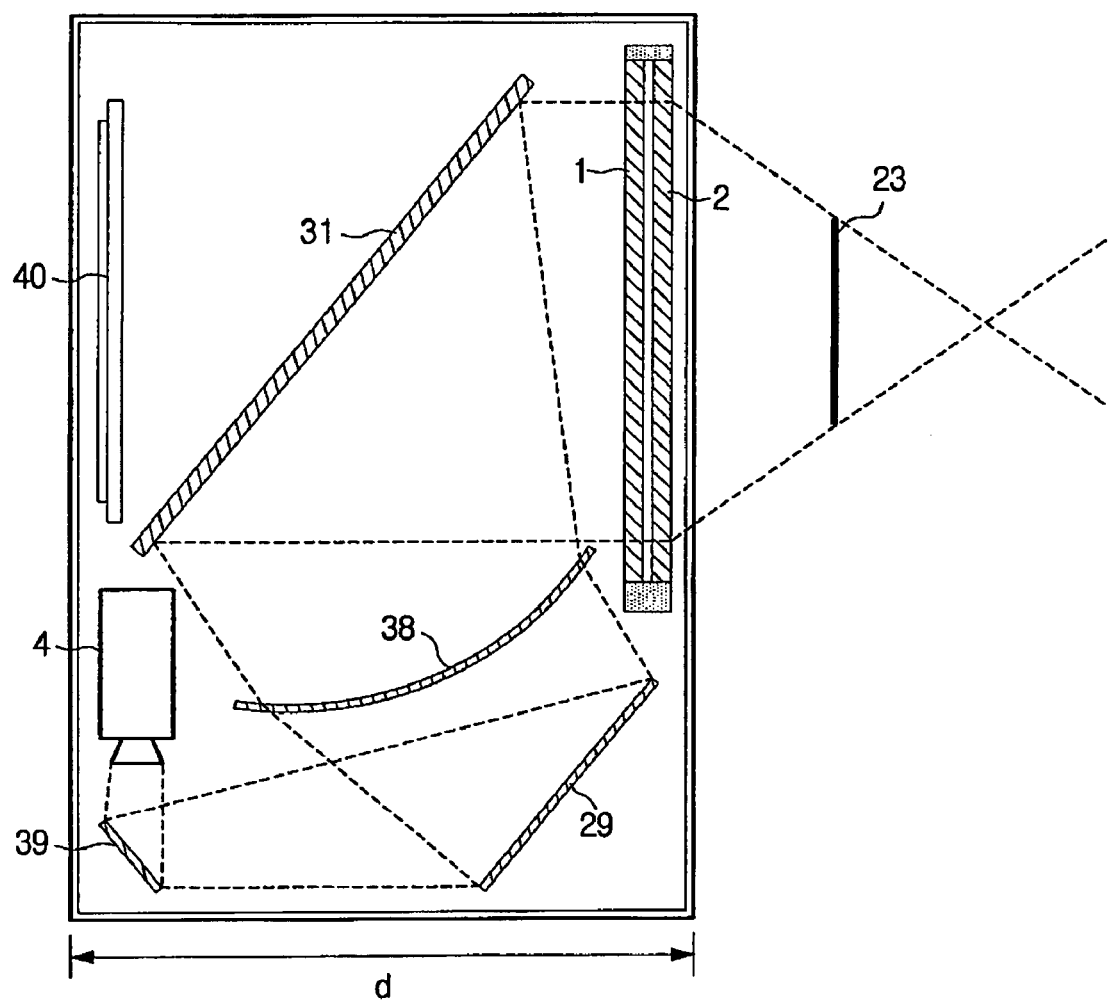
FIG. 7 shows a structural diagram of a three-dimensional image display device in accordance with a third embodiment of the present invention.

FIG. 7 is a structural diagram of a three-dimensional image display device based on a third embodiment of the present invention.

Referring to FIG. 7, the three-dimensional image display device includes an image source supply unit 4, a first and second reflectors 39, 29 and a curved screen 38 for forming an image source supplied by the image source supply unit 4 on a screen, a third reflector 31, which is partially transparent, for minimizing the width d between the screen and a first Fresnel lens 1, and a first Fresnel lens 1 and a second Fresnel lens 2 for forming a three-dimensional image. A second image source 40, as a background image, may be placed behind the partially transparent reflector 31 in order to enhance the three-dimensional effect.

As shown in FIG. 7, the display device can use an image on the curved transmissive screen 38 as a first image source, and the second image source 40 behind the partially transparent mirror 31 as a background screen of the first image source. The transmissivity of the partially transparent mirror is between 20% and 50%, the reflectivity between 80% and 50%, to be effective. This difference in distance from the first Fresnel lens 1 to the background image and the image source 1 allows three-dimensional images to form at different locations, resulting in the image of the image source forming in front of the background image, thereby giving deeper perspective. Furthermore, the image distortion can be minimized, expanding the utilizable scope of conventional Fresnel lenses, when creating large three-dimensional images.

Motor-Driven Background Screen Structure

Figure 8:
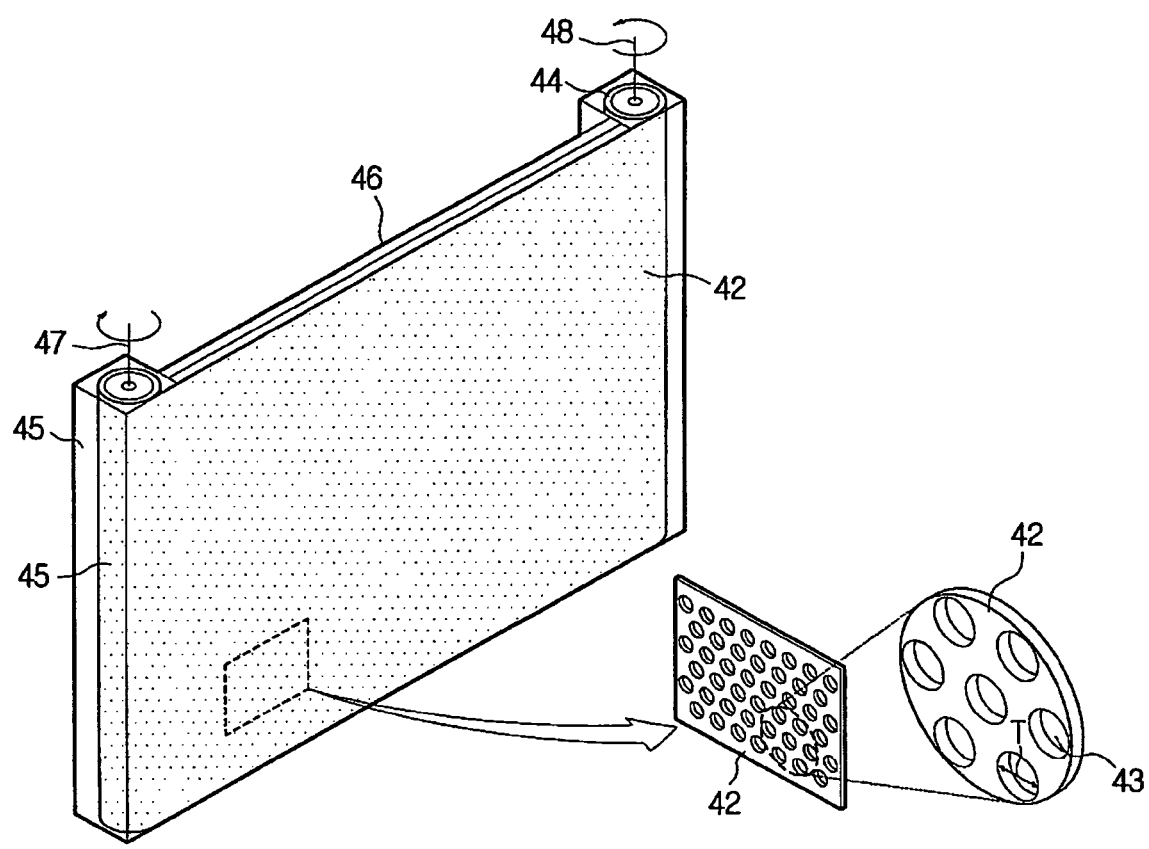
FIGS. 8 and 9 show structural diagrams of a motor-driven background screen filter device in accordance with one embodiment of the present invention.

FIG. 8 is a structural diagram of a motor-driven background screen filter device 46 based on one embodiment of the present invention.

It is necessary that the motor-driven background screen filter device 46, shown in FIG. 8, is made of a material, such as thin fabric or thin plastic, which can be easily rolled. This device comprises a filter 42, on which circular perforations 43 with uniform diameters T are uniformly distributed. On the left side 47 and right side 48 are roll-type axles, which can spin to move the filter from left to right or right to left. The device also comprises a housing 44, 45 that protects the background screen filter.

In case two or more Fresnel lenses are used in accordance with a conventional art, the lens-inherent external and internal reflections cause small virtual images while viewing the three-dimensional images. Although the area of semi-spherical focal plane formed by the double Fresnel lenses brings out the sense of three-dimensional perspective, the clear distinction from the fringe of the lens causes a circular area of focus, resulting in disharmony with the surrounding area. This is why conventional arts only used the center of the area the Fresnel lens projected or showed only the central region of the Fresnel lens in order to minimize these problems. A dark color filter or a black plastic case is sometimes used to address these problems, but this also brings down the brightness of the image source and complicates the product development. To solve these problems, a background screen filter, on which circular perforations small enough not to influence a projected three-dimensional image are formed, is used for a motor-driven background screen, as shown in FIG. 8.

Three-Dimensional Image Display Device Having Motor-Driven Background Screen

According to one embodiment of the present invention, a three-dimensional image display device comprises a background screen filter, on which perforations of particular diameter is uniformly distributed, in the front of a Fresnel lens unit for forming a three-dimensional image on a focal plane, axles for rolling the background screen filter, and motors for rotating the axles. Here, the three-dimensional image can be displayed on the background screen, which is physically changed as the axles are rotated. This will be described below with reference to FIGS. 8-10.

Referring to FIG. 8, a mask with uniformly distributed perforations, which are small enough not to influence projected three-dimensional images, are used. The background screen filter may take various shapes and forms, other than circular perforations, as long as they do not influence the image and brightness of the image source projected by the double Fresnel lenses. According to an embodiment of this invention, the circular perforations can be structured to have a diameter of 2-3 mm and a distance of 1-2 mm in order not to influence the projected image. A circular perforation mask of this type has an effect of eliminating reflections of the Fresnel lens itself and enhancing the perspective of a three-dimensional image by working as a background screen for the image source. A background screen filter based on one embodiment of the present invention can be realized as a fixed type, and can be realized as a mobile type in order to provide a more effective three-dimensional perspective. Moreover, various characters or pictures, which are dim enough not to interfere with the three-dimensional image of the image source, may be printed on the background screen filter for use as an advertisement. In other words, the background screen filter, as shown in FIG. 8, can be structured to have rolls on both axles to have a variety of background characters or pictures printed.

Figure 9:
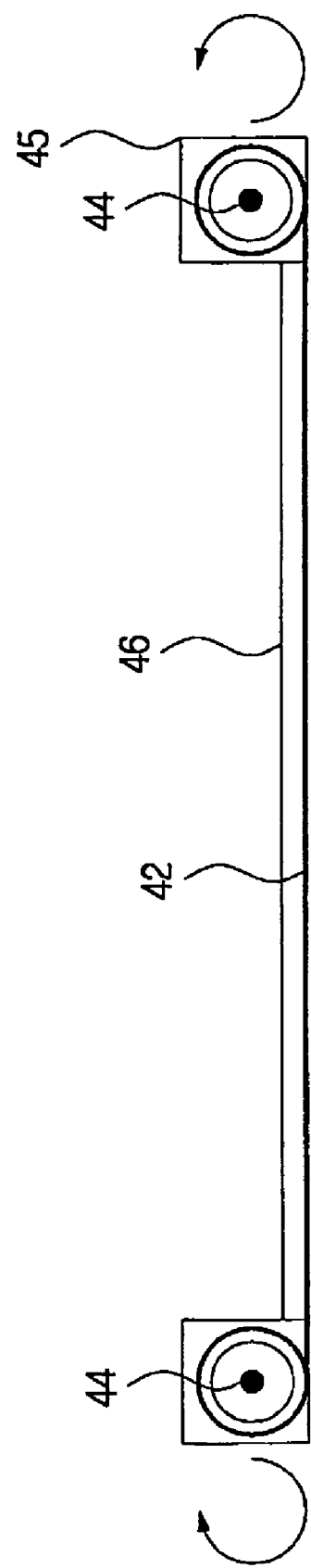

FIG. 9 is a cross section of the top of a motor-driven background screen filter based on one embodiment of the present invention.

Referring to FIG. 9, a three-dimensional image of the image source may be viewed while slowly moving the background screen filter, prepared in various types, to the right or left about the left axle using each circular motor on the left side and right side. The background screen filter is prepared in a size corresponding to the entire projection screen area of the device, and can be prepared to accommodate a number of background screens for the image source simultaneously. This type of physically-driven background screen can be used as a fixed type or a mobile type. While the background screen of the conventional art is realized as a fixed image, this type of background screen can enhance three-dimensionality much more effectively at a lower cost.

Figure 10:
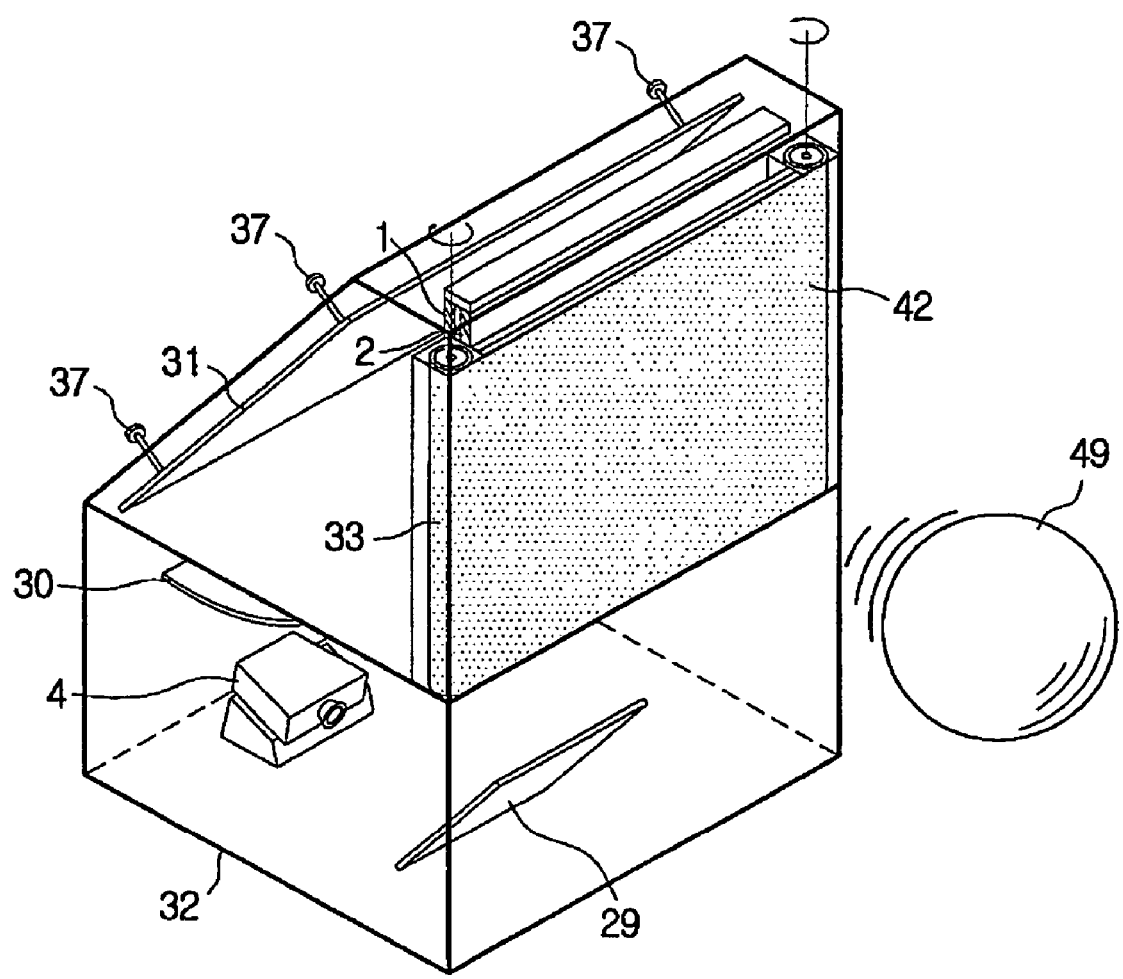
FIG. 10 shows a curved transmissive screen and a motor-driven background screen in accordance with one embodiment of the present invention.

FIG. 10 illustrates a display device, to which a curved transmissive screen and a motor-driven background screen are applied, based on one embodiment of the present invention.

The three-dimensional display device 32 with a motor-driven background screen 42 of FIG. 10 has a image source supply unit 4, a first reflector 29 for projecting an image from the image source, a curved transmissive screen 30 for reducing the distortion by a Fresnel lens, and a large, second reflector 31 for reflecting the image on the screen toward the first Fresnel lens 1. The image of the image source reflected from the large reflector 31 passes through the first Fresnel lens 1 and the second Fresnel lens 2, is projected in space as a three-dimensional image 49, and is fixed or moved as a background image to enhance the perspective and depth of the three-dimensional image 49.

The image formed on the curved transmissive screen 30 of FIG. 10 is reflected, refracted, and projected toward the first Fresnel lens 1 through the large reflector 31. The large reflector 31 is equipped with a controller unit 37 for adjusting the angle to the top, bottom, left, and right. As the image passes through the second Fresnel lens 2, a three-dimensional image 49 is formed on the focal plane 23 of the double Fresnel lenses 3. At the same time, the background filter device 42 can be fixed or positioned by moving left or right in order to provide a background appropriate for the image of the image source supply unit 4. The three-dimensional image formed in accordance with the embodiment shown in FIG. 10 can remove the diffused reflection by the background screen filter on the Fresnel lens and enhance the perspective, thereby allowing the viewing of more effective and realistic three-dimensional images.

A three-dimensional image display device in accordance with embodiments of the present invention can realize large-size three-dimensional images by using a curved transmissive screen to compensate for distorted images created in the conventional art.

At least one embodiment of the invention can also provide a three-dimensional image display device that has a reduced overall spatial width by minimizing the distance between the Fresnel lens and the screen by use of a curved transmissive screen and a reflector (or reflectors).

One embodiment of this invention can also realize an effective three-dimensional image display device by providing enhanced perspective on projected images by use of a physically-driven background screen.

In at least one embodiment, it is possible to manufacture a large quantity of devices that can realize large three-dimensional images at lower costs, using economical Fresnel lenses, transmissive screens, reflectors. Moreover, a three-dimensional image display device can be utilized in various applications, including large indoor/outdoor advertisement billboards, exhibition halls, events, theme parks, and medical facilities.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A three-dimensional image display device, comprising:
an image source configured to provice a main image;
a reflecting unit configured to reflect the image, wherein the reflected image is curved;
a Fresnel lens unit configured to receive the curved image and form a three-dimensional image; and
a background screen filter configured to receive the three-dimensional image from the Fresnel lens unit and add a background image to the three-dimensional image, wherein a plurality of holes are defined in the background screen filter.

2. The three-dimensional image display device of claim 1, wherein the reflecting unit comprises:
a first reflector configured to reflect the main image as a first refected image;
a second reflector configured to reflect the first reflected image as a second reflected image;
a transmissive curved screen configured to pass the reflected image therethrough so as to provide the curved image; and
a third reflector configured to reflect the curved image toward the Fresnel lens unit.

3. The three-dimensional image display device of claim 1 wherein the background screen filter is movable.

4. The three-dimensional image display device of claim 3, further comprises:
at least one axle configured to wind the background screen filter; and
at least one motor configured to rotate the at least one axle.

5. The three-dimensional image display device of claim 4, wherein the background image changes by the rotation of the at least one axle.

6. The three-dimensional image display device of claim 1, wherein, in operation, the background screen filter is located between the Fresnel lens unit and a viewer of the three-dimensional image display device.

7. A method of providing a three-dimensional image, comprising:
providing, via an image source, an image;
reflecting the image so as to provide a curved image;
receiving, at a Fresnel lens unit, the curved image so as to form a three-dimensional image; and
providing a background screen filter configured to receive the three-dimensional image from the Fresnel lens unit and add a background image to the three-dimensional image, wherein a plurality of holes are defined in the background screen filter.

8. The method of claim 7, wherein the reflecting comprises:
first reflecting the image;
transmitting the reflected image through a curved screen so as to provide the curved image; and
second reflecting the curved image toward the Fresnel lens unit.

9. The method of claim 7, wherein the reflecting comprises:
first reflecting the image;
second reflecting the first reflected image;
transmitting the second reflected image through a curved screen so as to provide the curved image; and
third reflecting the curved image toward the Fresnel lens unit.

10. The method of claim 7, wherein, in operation, the background screen filter is located between the Fresnel lens unit and a viewer of the three-dimensional image display device.

11. The method of claim 7, wherein the background screen filter is movable.

12. The three-dimensional image display device of claim 11, wherein the background image changes by the rotation of at least one axle.

13. A three-dimensional image display device, comprising:
an image source configured to provide a main image;
a reflecting unit configured to reflect the main image, wherein the reflected image is curved;
a Fresnel lens unit configured to receive the curved image and form a three-dimensional image; and
a background screen filter configured to provide a background image to the Fresnel lens unit, wherein the background image and the main image are combined by the Fresnel lens unit;
wherein the reflecting unit comprises:
a first reflector configured to reflect the main image as a first reflected image;
a second reflector configured to reflect the first reflected image as a second reflected image;
a transmissive curved screen configured to pass the second reflected image therethrough so as to provide the curved image; and
a third reflector configured to reflect the curved image toward the Fresnel lens unit;
wherein the third reflector is further configured to reflect the background image to the Fresnel lens unit;
wherein the background screen filter is movable; and
wherein the three-dimensional image display device further comprises:
at least one axle configured to wind the background screen filter; and
at least one motor configured to rotate the at least one axle.

* * * * *